(12) United States Patent
Genesseaux

(10) Patent No.: US 6,601,835 B2
(45) Date of Patent: Aug. 5, 2003

(54) HYDRAULIC ANTIVIBRATION SUPPORT

(75) Inventor: André Genesseaux, Conie-Molitard (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/112,966

(22) Filed: Mar. 29, 2002

(65) Prior Publication Data

US 2002/0149145 A1 Oct. 17, 2002

(30) Foreign Application Priority Data

Apr. 2, 2001 (FR) .............................. 01 04452

(51) Int. Cl.[7] .............................. F16F 15/00; F16F 5/00; F16F 7/00
(52) U.S. Cl. .............................. 267/140.13; 267/140.14
(58) Field of Search ........................ 267/140.13, 140.14, 267/140.11, 140.12

(56) References Cited

U.S. PATENT DOCUMENTS

| | | | |
|---|---|---|---|
| 4,836,515 A | | 6/1989 | Franz et al. |
| 4,869,478 A | * | 9/1989 | Bouhours et al. ...... 267/140.13 |
| 4,997,169 A | * | 3/1991 | Nakamura et al. ..... 267/140.13 |
| 5,102,105 A | * | 4/1992 | Hamaekers et al. ... 267/140.13 |
| 5,209,460 A | * | 5/1993 | Bouhours et al. ...... 267/140.14 |
| 5,344,127 A | * | 9/1994 | Hettler et al. .......... 267/140.13 |
| 5,667,205 A | | 9/1997 | Mutoh et al. |
| 5,911,412 A | * | 6/1999 | Durand et al. ......... 267/140.13 |
| 5,988,611 A | * | 11/1999 | Takashima et al. .... 267/140.13 |
| 6,036,183 A | * | 3/2000 | Lee et al. .............. 267/140.14 |
| 6,199,842 B1 | | 3/2001 | Gennesseaux et al. |
| 6,364,294 B1 | | 4/2002 | Gennesseaux et al. |
| 6,378,852 B1 | | 4/2002 | Ticks et al. |
| 6,439,554 B1 | * | 8/2002 | Takashima et al. .... 267/140.13 |
| 6,485,005 B1 | * | 11/2002 | Tewani et al. ......... 267/140.13 |

FOREIGN PATENT DOCUMENTS

| | | |
|---|---|---|
| DE | 199 02 494 | 10/2000 |
| EP | 0 596 767 | 5/1994 |
| EP | 0 840 035 | 5/1998 |
| EP | 0 852 304 | 7/1998 |
| EP | 0 939 243 | 9/1999 |
| EP | 0 957 287 | 11/1999 |
| FR | 2 782 764 | 3/2000 |
| FR | 2 793 859 | 11/2000 |

OTHER PUBLICATIONS

English–Language Abstract of European Publication No. 0 852 304, Publication Date: Jul. 8, 1998.
English–Language Abstract of European Publication No. 0 596 767, Publication Date: May 11, 1994.
English–Language Abstract of European Publication No. 0 939 243, Publication Date: Sep. 1, 1999.
English–Language Abstract of European Publication No. 0 957 287, Publication Date: Nov. 17, 1999.

* cited by examiner

Primary Examiner—Douglas C. Butler
Assistant Examiner—Robert A. Siconolfi
(74) Attorney, Agent, or Firm—Marshall, Gerstein & Borun

(57) ABSTRACT

The hydraulic antivibration support comprises two strength members interconnected by an elastomer body defining part of a liquid-filled working chamber which communicates via a constricted passage with a compensation chamber that is separated from said working chamber by a rigid partition. The compensation chamber is defined by an annular bellows presenting an annular fold which projects into the compensation chamber and which is of a shape that does not present circular symmetry.

10 Claims, 4 Drawing Sheets

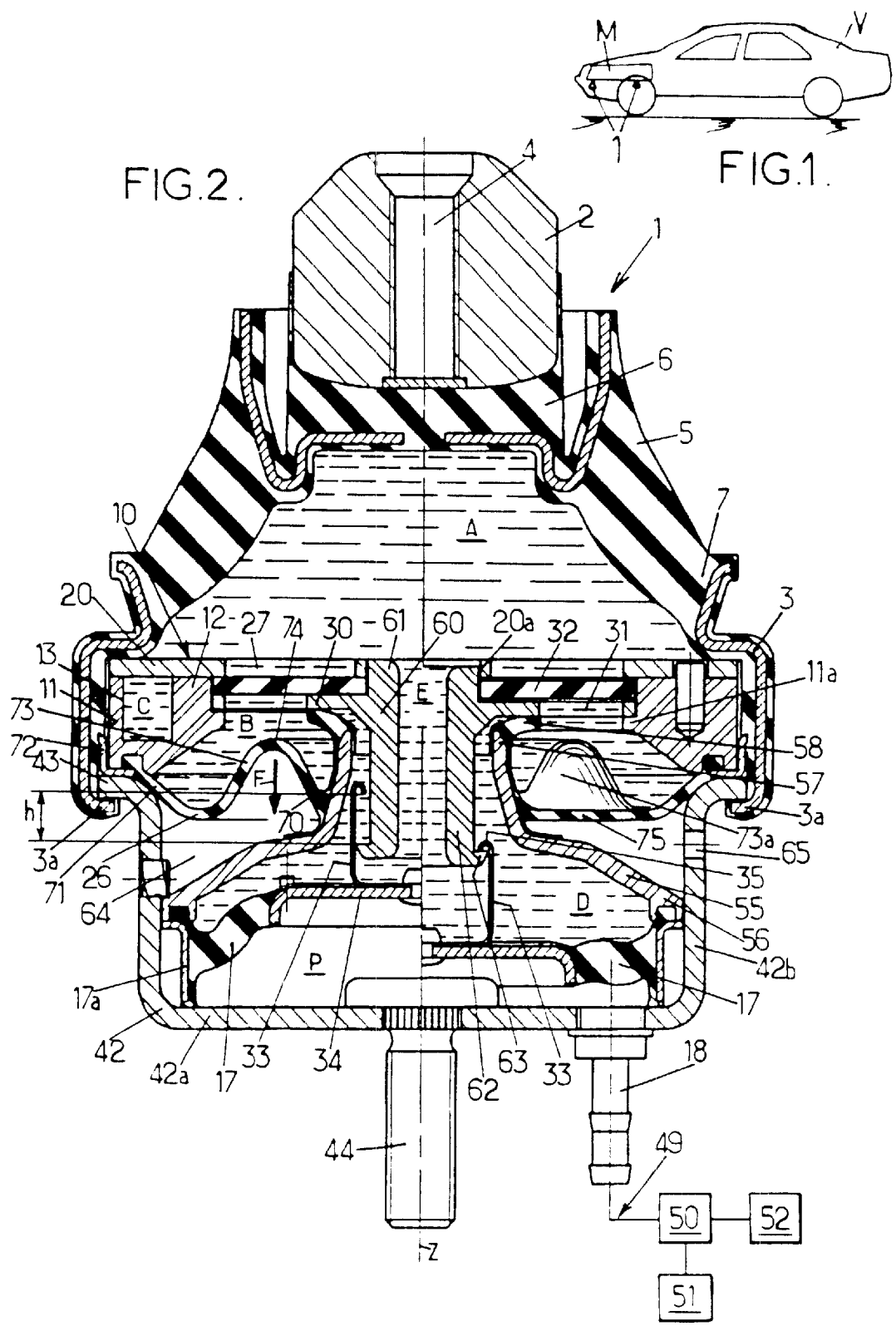

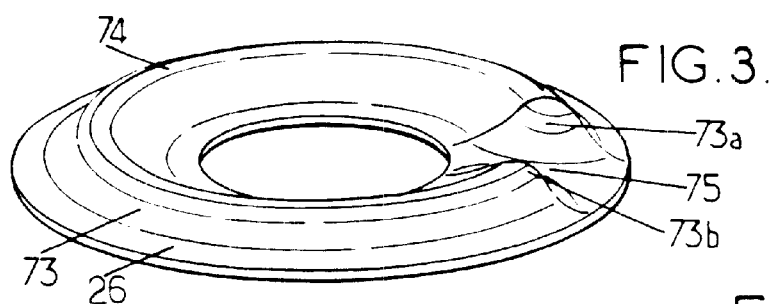
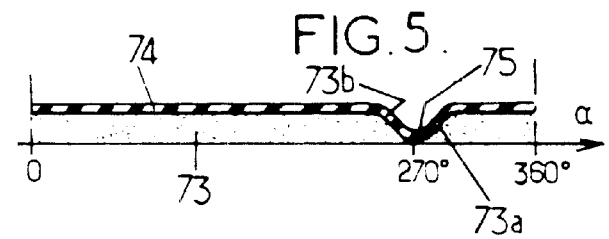
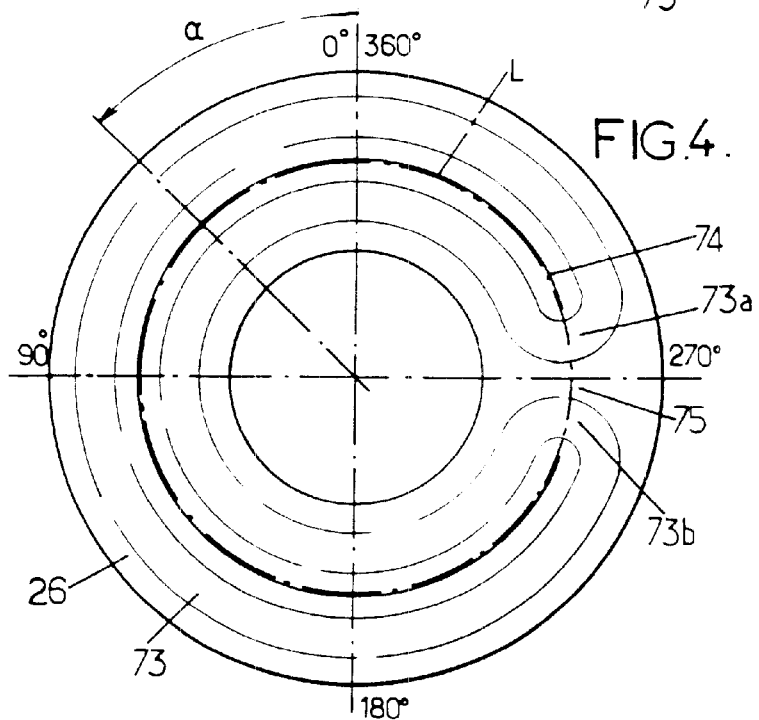
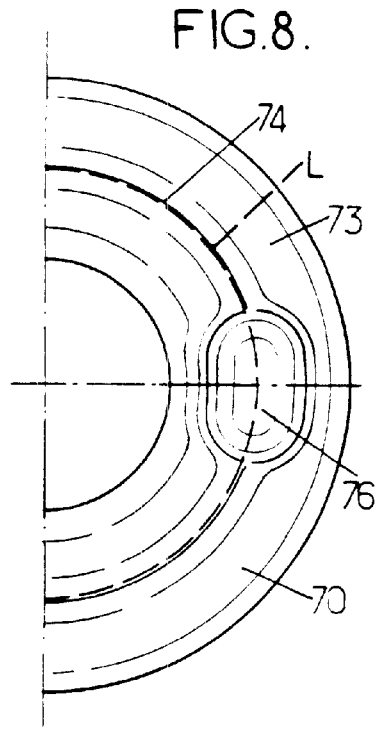
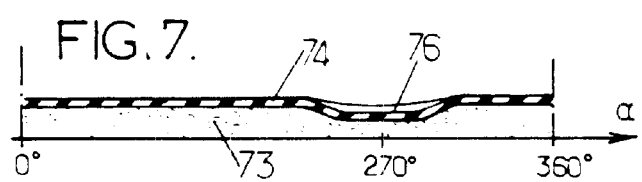
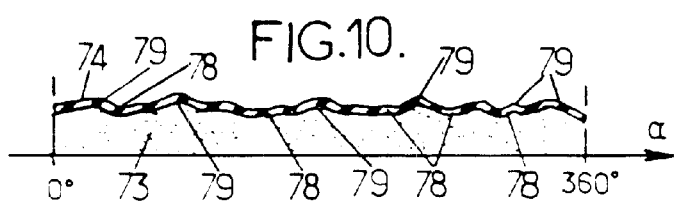

HYDRAULIC ANTIVIBRATION SUPPORT

The present invention relates to hydraulic antivibration supports, intended in particular for mounting the engine of a motor vehicle on the structure of the vehicle.

FIELD OF THE INVENTION

More particularly, the invention relates to a hydraulic antivibration support for interconnecting first and second rigid elements to damp vibration between said elements, the support comprising:

- first and second rigid strength members for fixing respectively to the first and second rigid elements;
- an elastomer body interconnecting the first and second strength members;
- a hydraulic working chamber filled with liquid, and defined at least in part by the elastomer body; and
- a flexible bellows of elastomer material defining at least part of a hydraulic compensation chamber filled with liquid which communicates with said working chamber via a constricted passage, said bellows presenting a central portion secured to a member carried by the second strength member and a periphery secured to said second strength member, and said bellows presenting a fold of generally annular shape centered on the central axis and projecting into the compensation chamber around said central portion of the bellows over a certain height up to a ridge of generally annular shape.

BACKGROUND OF THE INVENTION

Document EP-A-0 939 243 describes an example of such an antivibration structure.

In known antivibration supports of that kind, the fold of generally annular formed by the bellows presents the advantage of making it possible to increase the scope for varying the volume of the compensation chamber.

Nevertheless, antivibration supports of that type suffer from the drawback of presenting a relatively high level of bellows stiffness, and in some cases that can impede free deformation of the compensation chamber and hinder the operation of the antivibration support.

OBJECTS AND SUMMARY OF THE INVENTION

A particular object of the present invention is to mitigate that drawback.

According to the invention, this is achieved by an antivibration support of the kind in question, wherein the fold presents a shape that is not circularly symmetrical about the central axis, and wherein the fold presents locally at least one depression having a concave side facing towards the compensation chamber.

By means of these dispositions, the fold is prevented from stiffening the bellows by an arching effect while the volume of the working chamber is increasing. This significantly reduces the stiffness of the bellows, and the performance of the antivibration support is improved.

In preferred embodiments of the method of the invention, one or more of the following dispositions may optionally be used:

- said depression extends over substantially the full height of the fold;
- the fold of the bellows extends angularly over a circular arc between two ends which are separated from each other by said depression that forms a non-folded zone of the bellows;
- said depression is located in the ridge of the fold;
- said depression is of a shape integrally molded with the bellows;
- the antivibration support comprises at least one rigid bearing element secured to the second strength member and bearing locally on the fold so as to form said depression;
- the bellows presents, in the ridge of the fold, a shape that is irregular, forming a succession of portions projecting towards the compensation chamber and of depressions each having a concave side that is open towards the compensation chamber;
- the working chamber and the compensation chamber are separated from each other by a rigid partition having a central bore putting said working chamber into communication with an exciter member mounted to move perpendicularly to the rigid partition and controlled by a control device;
- the exciter member is a flexible diaphragm having a first face which communicates with the working chamber via said central bore, and a second face which communicates with a pneumatic chamber having a coupling suitable for being connected to an external pneumatic source; and
- the antivibration support includes a cover presenting an end wall and a peripheral wall secured to the second strength member and co-operating therewith to define a hollow inside space, said inside space containing a ring which connects the cover in sealed manner to the rigid partition around said central bore, the pneumatic chamber being defined between the flexible diaphragm and the end wall of the cover, the central portion of the bellows being secured to said ring, the compensation chamber being placed around said ring in the vicinity of the rigid partition, and an intermediate hydraulic chamber which communicates with said central bore being defined between the flexible diaphragm and said rigid ring.

BRIEF DESCRIPTION OF THE DRAWINGS

Other characteristics and advantages of the invention appear from the following description of four embodiments, given as non-limiting examples, and described with reference to the accompanying drawings.

In the drawings:

FIG. 1 is a diagrammatic view of a motor vehicle suitable for being fitted with an antivibration support of the invention;

FIG. 2 is a vertical section view through an antivibration support constituting a first embodiment of the invention;

FIG. 3 is a diagrammatic perspective view of an elastomer bellows forming part of the FIG. 1 antivibration support;

FIG. 4 is a plan view of the FIG. 2 bellows;

FIG. 5 is a developed section view on line L of FIG. 4;

FIG. 7 is a view similar to FIG. 5 in the second embodiment of the invention;

FIG. 8 is a half-view of the support bellows of FIG. 6 as seen from above;

FIG. 10 is a view similar to FIG. 5 for a fourth embodiment of the invention.

MORE DETAILED DESCRIPTION

Figure 6:
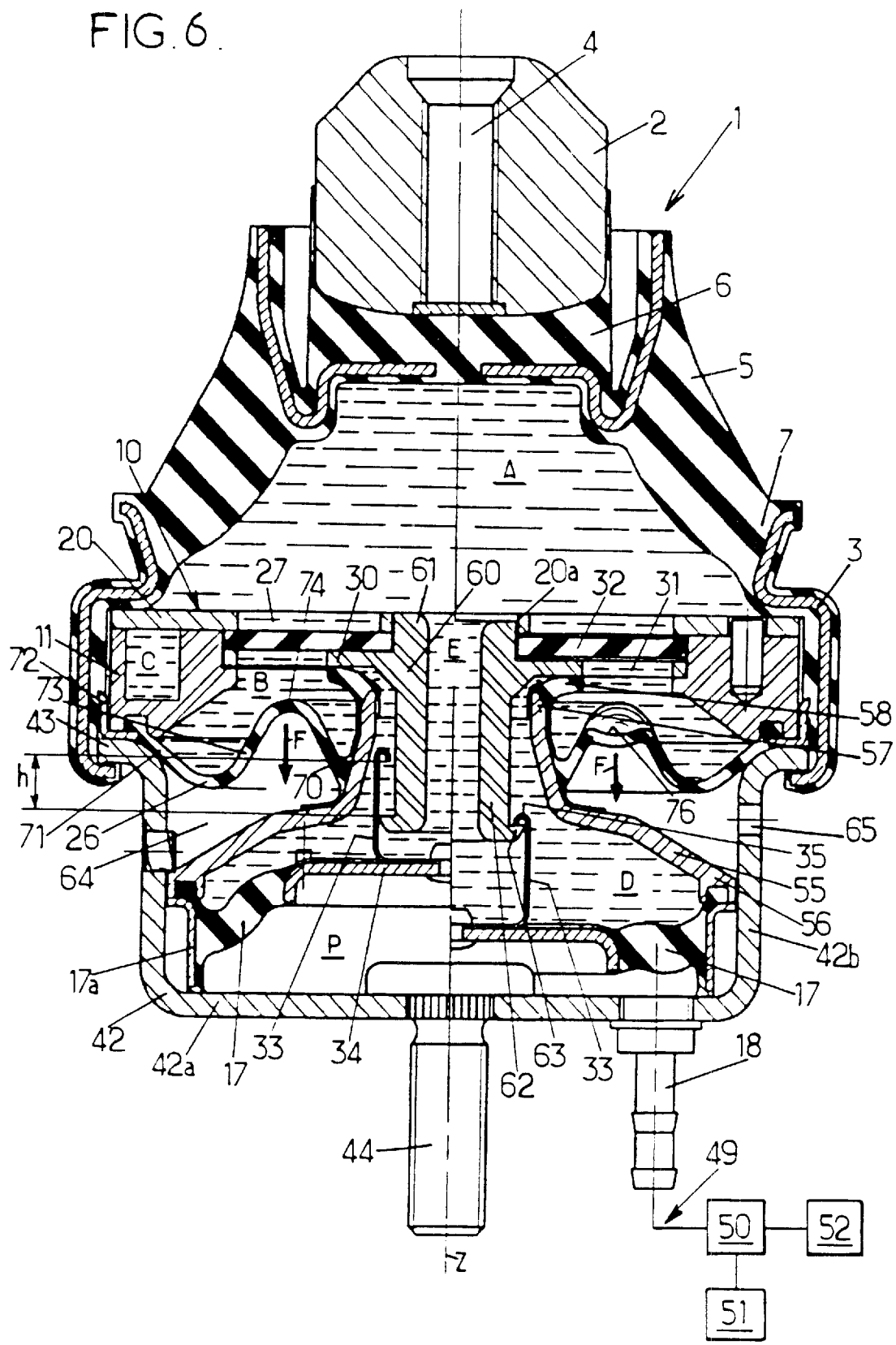
FIG. 6 is a view similar to FIG. 2 for a second embodiment of the invention.

In the various figures, the same references are used to designate elements that are identical or similar.

In the description below, terms such as "up, down, bottom, top, horizontal, vertical" are used solely for the purpose of clarifying the description, and they refer to the usual position in which the device of the invention is used, however these terms are not limiting.

FIG. 1 is a highly diagrammatic view of a motor vehicle having an internal combustion engine M supported on the vehicle body V via hydraulic antivibration supports 1.

In a first embodiment of the invention, shown in FIG. 2, the hydraulic antivibration support 1 comprises first and second strength members 2, 3 for fixing respectively to the engine unit M and to the bodywork V.

In the example described, the first strength member 2 is in the form of a stud centered on a vertical axis Z and pierced by a tapped hole 4 enabling it to be fixed to the engine unit M, while the second strength member 3 is formed by a steel ring, likewise centered on the axis Z.

These two strength members 2 and 3 are interconnected by a relatively thick elastomer body 5 which presents sufficient compression strength to be able to take up the static forces due to the weight of the engine unit. The elastomer body 5 has a bell-shaped side wall which extends between a top 6 secured to the stud 2 and an angular base 7 which is secured to the ring 3.

The second strength member 3 surrounds a rigid partition 10 which co-operates with the elastomer body 5 to define a working chamber A that is filled with liquid.

In the example described here, the partition 10 comprises a molded body 11 of light alloy which itself forms a ring 12 centered on the axis Z and has an upwardly-open trough 13 formed therein which extends angularly around a fraction of the periphery of the ring 12.

The rigid partition 10 further comprises a cover 20 of sheet steel or the like, which covers said body 11 towards the working chamber A.

The cover 20 closes the top portion of the trough 13 formed in the body of the rigid partition, thereby cooperating with said trough to define a constricted passage C which is filled with liquid and which extends between two ends opening out respectively into the working chamber A and into a compensation chamber B.

In addition, the cover 20 also comprises, radially on the inside of the constricted passage C, an annular grid 27 formed by a series of holes that are angularly distributed around the axis Z.

The cover 20 is pierced by a central hole 20a slidably receiving a rigid tube 60, e.g. made of light alloy or of plastics material. This sliding tube is shown in its high position on the left-hand side of FIG. 2 and in its low position on the right-hand side of FIG. 2.

The inside of the tube 60 defines a central bore E which is in communication with the working chamber A, and it extends along the axis Z between a top end 61 and a bottom end 62.

The bottom end 62 is provided with an annular outwardly-directed rim 63, and a grid 30 secured to the tube 60 extends radially outwards from said tube in the vicinity of its top end 61.

The grid 30 which is pierced by orifices 31 is mounted to move parallel to the axis Z in a housing defined between the grid 27 and an inside shoulder 11a of the above-mentioned body 11.

In addition, an annular elastomer flap 32 is held captive between the two grids 30 and 27, with the flap 32 extending radially relative to the axis Z.

Furthermore, beneath the body 11 of the partition 10, there is placed a cover 42 which comprises:

an end wall 42a that is substantially perpendicular to the axis Z;

an annular side wall 42b that extends parallel to the axis Z as far as the body 11; and an outwardly-directed annular rim 43 that extends substantially radially relative to the axis Z.

The end wall 42a of the cover 42 is secured to a bolt 44 or any other means suitable for fastening said end wall to the bodywork of the vehicle.

In addition, a pneumatic chamber P is defined between the end wall 42a of the cover 42 and a flexible elastomer diaphragm 17. By way of example, this diaphragm 17 can be provided at its outer periphery with a rigid reinforcing rim 17a that is engaged as a force-fit within the cover 42.

In the example shown, the central portion of the diaphragm 17 has a rigid central reinforcing plate 34 provided with tabs 33, e.g. made of metal or plastic material, which tabs 33 extend axially along the axis Z to free ends that form inwardly-directed hooks 35. The tabs 33 are engaged around the outwardly-directed rim 63 of the tube 60 and the hooks 35 are disposed at a height h above said rim 64 when the diaphragm 17 is in its rest position.

The pneumatic chamber P is connected via a coupling 18 to an external pneumatic circuit 49 adapted to communicate either with the air admission circuit 52 of the engine or else with the atmosphere. The circuit 42 is put into communication with the admission circuit 52 or with the atmosphere by means of a three-port solenoid valve 50 controlled by a control circuit 51 such as an on-board computer of the vehicle, or the like.

A rigid ring 55, e.g. made of light alloy or of plastics material, is also located in the inside space defined between the cover 42 and the partition 10.

This ring 55, which can be made of light alloy or of plastics material for example, presents a bottom annular edge 56 which can be engaged by force in the side wall 42b of the cover, and it has a top annular edge 57 of smaller diameter which is located in the vicinity of the rigid partition 10.

The top annular edge 57 of the ring 55 presents a compressible elastomer lip 58 placed to bear in sealed manner against a solid inside annular portion of the grid 30.

The antivibration support also has an annular bellows 26 made of elastomer and centered on the axis Z.

The inside periphery 70 of the elastomer bellows is overmolded and bonded onto the ring 55, the bellows 26 preferably being integral with the above-mentioned compressible lip 58.

In addition, the outer periphery 71 of the bellows, which can be reinforced in particular by a metal rigid ring 72 or the like, is clamped axially against the body 11 against the partition 10 by the outwardly-directed rim 43 of the cover, which rim 43 is itself pressed against the outer periphery of the bellows by crimping bottom tabs 3a belonging to the second strength member 3.

The elastomer bellows 26 co-operates with the partition 10 and the ring 55 to define the above-mentioned compensation chamber B which communicates with the flap 32 via openings 31 in the grid.

An intermediate chamber D which communicates with the central bore E is also defined between the ring 55 and the diaphragm 17, and an intermediate space 64 communicating with the atmosphere via an orifice 65 in the side wall of the cover 42 is left free beneath the bellows 26.

As shown in greater detail in FIGS. 3 to 5, the bellows 26 forms a fold 73 that is generally annular in shape, said fold projecting into the compensation chamber B so as to form a ridge 74 that is likewise annular in shape and centered on the axis Z. To make this fold easier to deform in the direction of an arrow F that can be seen in FIG. 2, the fold 73 is of a shape that is not circularly symmetrical about the central axis Z, and more particularly, the fold 73 presents a localized depression 75 with a concave side facing towards the compensation chamber B.

In the example under consideration, the depression 75 extends over substantially the full height of the fold 73 such that the fold 73 in the bellows extends angularly over a circular arc between two ends 73a and 73b which are separated from each other by a non-folded zone of the bellows 26 formed by said depression 75.

Because of the presence of the depression 75, the bellows 26 presents very low stiffness and offers practically no resistance against transfers of liquid between the working chamber A and the compensation chamber B, thereby improving the operation of the antivibration support.

The antivibration support as described above operates as follows.

When the vehicle in which the antivibration support is installed is not in operation, then the support remains in the rest position shown on the left-hand side of FIG. 2.

When the vehicle engine is started and runs at idling speed, thus generating vibration at the stud 2 that generally presents a frequency lying in the range 20 hertz (Hz) to 80 Hz, or indeed in the range 10 Hz to 90 Hz, the pneumatic chamber P is subjected to reduced pressure and to atmospheric pressure in alternation by the solenoid valve 50 under the control of the computer 51. As a result the flexible diaphragm 17 is set into vibratory motion, with this vibratory motion emitting counter-acting vibration into the intermediate chamber D seeking to neutralize the effect of engine vibration.

The counter-acting vibration is optimized by the computer 51 in application of a predetermined function as a function of engine speed and various parameters that can influence vibration while idling (operation of the air conditioner, electricity consumption, engine temperature, etc.), e.g. by acting on the following parameters:

the amplitude of the vibration of the diaphragm 17, which amplitude is controlled by acting on the duty ratio of the signal applied to the solenoid valve 50 (ratio of the time during which the valve 50 puts the pneumatic chamber P in communication with low pressure, over the total duration of one period of the vibration); and the phase of the vibration of the diaphragm 17 which is controlled by acting on the initial instant of each actuation cycle of the solenoid valve 50 relative to rotation of the engine, which rotation is identified, for example, by a particular cylinder passing through top dead-center.

The counter-acting vibration emitted in this way by the diaphragm 17 into the intermediate chamber D is transmitted to the working chamber A via the bore E which can advantageously be dimensioned in such a manner as to present a resonant frequency situated, for example, in the range 10 Hz to 90 Hz, and corresponding substantially to the idling frequency.

While the engine is idling, the amplitude of the vibration to which the diaphragm 17 is subjected is such that the diaphragm moves relative to its rest position through a height smaller than the above-mentioned height h, at least most of the time, such that the flap 32 remains held under thrust from the lip 58 and does not impede the effect of said counter-acting vibration.

In contrast, when the vehicle is running, the solenoid valve 50 is actuated so as to cause the pneumatic chamber B to be connected continuously to the suction, as represented on the right-hand side in FIG. 2. This results in the flexible diaphragm 17 pressing substantially against the end wall 16. In this abutment position, the hooks 35 on the tabs 33 pull the tube 60 and the grid 30 downwards, flattening the lip 58, and thus leaving a small amount of vertical clearance for the flap 32, which clearance is typically of the order of 0.5 millimeters (mm) to 1 mm.

Thus, while the vehicle is running, the flap 32 provides axial decoupling between the strength members 2 and 3 with respect to vibration of high frequency and of low amplitude (e.g. at a frequency greater than 20 Hz or 50 Hz and an amplitude of less than 1 mm), while the constricted passage C is dimensioned so as to present a resonant frequency that is generally below 20 Hz, so as to damp chopping movements of relatively low frequency (e.g. below 20 Hz) and of relatively large amplitude (e.g. greater than 1 mm) as generated by the motion of the vehicle while it is running.

In the second embodiment of the invention, as shown in FIGS. 6 to 8, the ridge 74 of the annular fold 73 in the bellows is provided as before with a depression 76 whose concave side faces towards the compensation chamber B, but in this case the depression extends solely over a fraction of the height of the fold.

In this second embodiment, as in the first embodiment as described above, the depression formed in the fold 73 of the bellows is obtained when molding the bellows 26.

Figure 9:
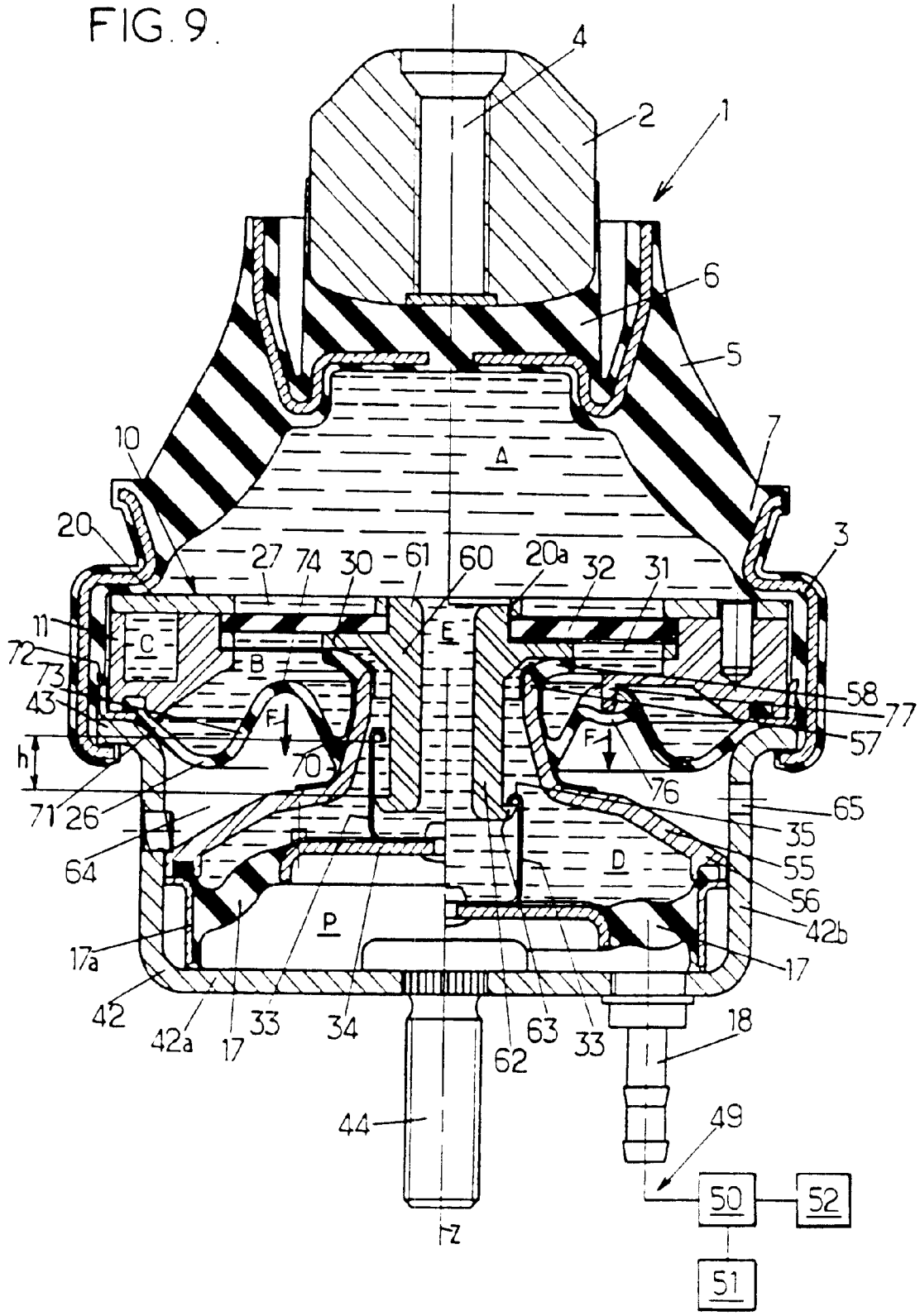
FIG. 9 is a view similar to FIG. 6 for a third embodiment of the invention.

In a third embodiment, shown in FIG. 9, the depression 76, e.g. identical or similar in shape to the depression 76 of the second embodiment as described above, can be obtained by means of a rigid finger 77 or some other presser element, e.g. belonging to the body 11 of the partition 10 and projecting axially downwards in the compensation chamber B so as to press locally on the ridge 74 of the fold 73.

Under such circumstances, the bellows 26 can be molded with an annular fold 73 that is circularly symmetrical about the axis Z, the local depression 76 then being obtained during assembly of the antivibration support.

Finally, as shown in FIG. 10, in a fourth embodiment of the invention, the bellows 26 can be irregular in shape at the ridge 74 of its fold 73, forming a succession of depressions 78 each having a concave side open towards the compensation chamber B, and portions 79 projecting towards the compensation chamber B. This irregular shape can be obtained in particular during molding of the bellows 26.

What is claimed is:

1. A hydraulic antivibration support for interconnecting first and second rigid elements to damp vibration between said elements, the support comprising:

first and second rigid strength members for fixing respectively to the first and second rigid elements;

an elastomer body interconnecting the first and second strength members;

a hydraulic working chamber filled with liquid, and defined at least in part by the elastomer body; and a flexible bellows of elastomer material defining at least part of a hydraulic compensation chamber filled with liquid which communicates with said working chamber via a constricted passage, said bellows presenting a central portion secured to a member carried by the second strength member and a periphery secured to said second strength member, and said bellows presenting a fold of generally annular shape centered on the central axis and projecting into the compensation chamber around said central portion of the bellows over a certain height up to a ridge of generally annular shape, wherein the fold presents a shape that is not circularly symmetrical about the central axis, and wherein the fold presents locally at least one depression having a concave side facing towards the compensation chamber.

2. An antivibration support according to claim 1, in which said depression extends over substantially the full height of the fold.

3. An antivibration support according to claim 2, in which the fold of the bellows extends angularly over a circular arc between two ends which are separated from each other by said depression that forms a non-folded zone of the bellows.

4. An antivibration support according to claim 1, in which said depression is located in the ridge of the fold.

5. An antivibration support according to claim 1, in which said depression is of a shape integrally molded with the bellows.

6. An antivibration support according to claim 4, including at least one rigid bearing element secured to the second strength member and bearing locally on the fold so as to form said depression.

7. An antivibration support according to claim 1, in which the bellows presents, in the ridge of the fold, a shape that is irregular, forming a succession of portions projecting towards the compensation chamber and of depressions each having a concave side that is open towards the compensation chamber.

8. An antivibration support according to claim 1, in which the working chamber and the compensation chamber are separated from each other by a rigid partition having a central bore putting said working chamber into communication with an exciter member mounted to move perpendicularly to the rigid partition and controlled by a control device.

9. An antivibration support according to claim 8, in which the exciter member is a flexible diaphragm having a first face which communicates with the working chamber via said central bore, and a second face which communicates with a pneumatic chamber having a coupling suitable for being connected to an external pneumatic source.

10. An antivibration support according to claim 9, including a cover presenting an end wall and a peripheral wall secured to the second strength member and cooperating therewith to define a hollow inside space, said inside space containing a ring which connects the cover in sealed manner to the rigid partition around said central bore, the pneumatic chamber being defined between the flexible diaphragm and the end wall of the cover, the central portion of the bellows being secured to said ring, the compensation chamber being placed around said ring in the vicinity of the rigid partition, and an intermediate hydraulic chamber which communicates with said central bore being defined between the flexible diaphragm and said rigid ring.

* * * * *